(12) United States Patent
Vespe et al.

(10) Patent No.: US 10,459,955 B1
(45) Date of Patent: *Oct. 29, 2019

(54) DETERMINING GEOGRAPHIC LOCATIONS FOR PLACE NAMES

(71) Applicant: Google LLC, Mountain View, CA (US)

(72) Inventors: David J. Vespe, New York, NY (US); Andrew Hogue, Ho Ho Kus, NJ (US)

(73) Assignee: GOOGLE LLC, Mountain View, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 15/891,613

(22) Filed: Feb. 8, 2018

Related U.S. Application Data

(63) Continuation of application No. 13/732,157, filed on Dec. 31, 2012, now Pat. No. 9,892,132, which is a
(Continued)

(51) Int. Cl.
*G06F 16/29* (2019.01)
*G06F 16/583* (2019.01)
(Continued)

(52) U.S. Cl.
CPC .......... *G06F 16/29* (2019.01); *G06F 16/5846* (2019.01); *G06F 16/95* (2019.01); *G06F 17/278* (2013.01); *G06F 17/2765* (2013.01)

(58) Field of Classification Search
CPC ............... G06F 17/2765; G06F 17/278; G06F 17/30241; G06F 17/30258; G06F 17/30861

See application file for complete search history.

(56) References Cited

U.S. PATENT DOCUMENTS 5,475,819 A  12/1995  Miller et al.
5,560,005 A   9/1996  Hoover et al.
(Continued)

FOREIGN PATENT DOCUMENTS

WO   2004114163 A2   12/2004

OTHER PUBLICATIONS

Martins et al., "Handling Locations in Search Engine Queries", Aug. 10, 2006, Seattle, Washington, Copyright 2006 ACM, pp. 6 (Year: 2006).*
(Continued)

*Primary Examiner* — Chau T Nguyen
(74) *Attorney, Agent, or Firm* — Brake Hughes Bellermann LLP

(57) ABSTRACT

A system and method for tagging place names with geographic location coordinates, the place names associated with a collection of objects in a memory of a computer system. The system and method process a text string within an object stored in memory to identify a first potential place name. The system and method determine whether geographic location coordinates are known for the first potential place name. The system and method identify the first potential place name associated with an object in the memory as a place name. The system and method tag the first identified place name associated with an object in the memory with its geographic location coordinates, when the geographic location coordinates for the first identified place name are known. The system and method disambiguate place names when multiple place names are found.

20 Claims, 15 Drawing Sheets

Related U.S. Application Data continuation of application No. 11/686,217, filed on Mar. 14, 2007, now Pat. No. 8,347,202.

(51) Int. Cl.
*G06F 16/95* (2019.01)
*G06F 17/27* (2006.01)

(56) References Cited

U.S. PATENT DOCUMENTS

| | | | |
|---|---|---|---|
| 5,574,898 A | 11/1996 | Leblang et al. | |
| 6,038,560 A | 3/2000 | Wical | |
| 6,202,065 B1 | 3/2001 | Wills et al. | |
| 6,487,495 B1 | 11/2002 | Gale et al. | |
| 6,565,610 B1 | 5/2003 | Wang et al. | |
| 6,584,464 B1 | 6/2003 | Warthen et al. | |
| 6,636,742 B1 | 10/2003 | Torkki et al. | |
| 6,868,411 B2 | 3/2005 | Shanahan et al. | |
| 6,996,572 B1 | 2/2006 | Chakrabarti et al. | |
| 7,007,228 B1 | 2/2006 | Carro et al. | |
| 7,080,073 B1 | 7/2006 | Jiang et al. | |
| 7,269,587 B1 | 9/2007 | Page et al. | |
| 7,403,939 B1 | 7/2008 | Virdy | |
| 7,454,430 B1 | 11/2008 | Komissarchik et al. | |
| 7,660,784 B1 | 2/2010 | Virdy et al. | |
| 7,917,154 B2 | 3/2011 | Fortescue et al. | |
| 8,086,690 B1 | 12/2011 | Heymans et al. | |
| 8,108,501 B2 | 1/2012 | Birnie et al. | |
| 8,122,026 B1 | 2/2012 | Laroco et al. | |
| 8,176,027 B1* | 5/2012 | Shuman | G06F 17/30241 707/706 |
| 8,347,202 B1 | 1/2013 | Vespe et al. | |
| 8,650,175 B2 | 2/2014 | Hogue et al. | |
| 8,751,498 B2 | 6/2014 | Yakovenko et al. | |
| 8,812,435 B1 | 8/2014 | Zhao | |
| 8,825,471 B2 | 9/2014 | Zhao et al. | |
| 9,092,495 B2 | 7/2015 | Hogue et al. | |
| 9,208,229 B2 | 12/2015 | Betz et al. | |
| 9,558,186 B2 | 1/2017 | Betz et al. | |
| 9,892,132 B2 | 2/2018 | Vespe et al. | |
| 2001/0021935 A1 | 9/2001 | Mills et al. | |
| 2002/0022956 A1 | 2/2002 | Ukrainczyk et al. | |
| 2002/0038307 A1 | 3/2002 | Obradovic et al. | |
| 2002/0042707 A1 | 4/2002 | Zhao et al. | |
| 2002/0055954 A1 | 5/2002 | Breuer et al. | |
| 2002/0065814 A1 | 5/2002 | Okamoto et al. | |
| 2002/0065815 A1 | 5/2002 | Layden et al. | |
| 2002/0065845 A1 | 5/2002 | Naito et al. | |
| 2002/0073115 A1 | 6/2002 | Davis et al. | |
| 2002/0083039 A1 | 6/2002 | Ferrari et al. | |
| 2002/0087567 A1 | 7/2002 | Spiegler et al. | |
| 2002/0107861 A1 | 8/2002 | Clendinning et al. | |
| 2002/0128818 A1 | 9/2002 | Ho et al. | |
| 2002/0147738 A1 | 10/2002 | Reader et al. | |
| 2002/0154175 A1 | 10/2002 | Abello et al. | |
| 2002/0169770 A1 | 11/2002 | Kim et al. | |
| 2002/0173984 A1 | 11/2002 | Robertson et al. | |
| 2002/0174099 A1 | 11/2002 | Raj et al. | |
| 2002/0178448 A1 | 11/2002 | Te Kiefte et al. | |
| 2002/0194172 A1 | 12/2002 | Schreiber et al. | |
| 2003/0005036 A1 | 1/2003 | Mitzenmacher et al. | |
| 2003/0018652 A1 | 1/2003 | Heckerman et al. | |
| 2003/0058706 A1 | 3/2003 | Okamoto et al. | |
| 2003/0069880 A1 | 4/2003 | Harrison et al. | |
| 2003/0078902 A1 | 4/2003 | Leong et al. | |
| 2003/0088607 A1 | 5/2003 | Ruellan et al. | |
| 2003/0097357 A1 | 5/2003 | Ferrari et al. | |
| 2003/0115485 A1 | 6/2003 | Milliken et al. | |
| 2003/0120373 A1 | 6/2003 | Eames et al. | |
| 2003/0120644 A1 | 6/2003 | Shirota et al. | |
| 2003/0120654 A1 | 6/2003 | Edlund et al. | |
| 2003/0120659 A1 | 6/2003 | Sridhar et al. | |
| 2003/0120675 A1 | 6/2003 | Stauber et al. | |
| 2003/0126102 A1 | 7/2003 | Borthwick et al. | |
| 2003/0126152 A1 | 7/2003 | Rajak et al. | |
| 2003/0149567 A1 | 8/2003 | Schmitz et al. | |
| 2003/0149699 A1 | 8/2003 | Tsao et al. | |
| 2003/0154071 A1 | 8/2003 | Shreve et al. | |
| 2004/0006576 A1 | 1/2004 | Colbath et al. | |
| 2004/0059726 A1 | 3/2004 | Hunter et al. | |
| 2004/0122846 A1 | 6/2004 | Chess et al. | |
| 2004/0167907 A1 | 8/2004 | Wakefield et al. | |
| 2004/0167911 A1 | 8/2004 | Wakefield et al. | |
| 2004/0255237 A1 | 12/2004 | Tong et al. | |
| 2004/0268237 A1 | 12/2004 | Jones et al. | |
| 2005/0034062 A1* | 2/2005 | Bufkin | G06F 17/241 715/230 |
| 2005/0055365 A1 | 3/2005 | Ramakrishnan et al. | |
| 2005/0086222 A1 | 4/2005 | Wang et al. | |
| 2005/0108630 A1 | 5/2005 | Wasson et al. | |
| 2005/0114324 A1 | 5/2005 | Mayer et al. | |
| 2005/0138007 A1 | 6/2005 | Amitay et al. | |
| 2005/0144241 A1 | 6/2005 | Stata et al. | |
| 2005/0165781 A1 | 7/2005 | Kraft et al. | |
| 2005/0171691 A1* | 8/2005 | Smartt | G01C 21/3605 701/426 |
| 2005/0278314 A1 | 12/2005 | Buchheit et al. | |
| 2005/0278378 A1* | 12/2005 | Frank | G06F 17/30616 |
| 2006/0041375 A1 | 2/2006 | Witmer et al. | |
| 2006/0047691 A1 | 3/2006 | Humphreys et al. | |
| 2006/0074910 A1 | 4/2006 | Yun et al. | |
| 2006/0129843 A1 | 6/2006 | Srinivasa et al. | |
| 2006/0149800 A1 | 7/2006 | Egnor et al. | |
| 2006/0197763 A1* | 9/2006 | Harrison | G06Q 10/10 345/441 |
| 2006/0293879 A1 | 12/2006 | Zhao et al. | |
| 2007/0106455 A1 | 5/2007 | Fuchs et al. | |
| 2007/0112777 A1* | 5/2007 | Field | G06F 17/3087 |
| 2007/0143282 A1 | 6/2007 | Betz et al. | |
| 2007/0150199 A1* | 6/2007 | Riise | G06F 16/9537 702/5 |
| 2007/0150800 A1 | 6/2007 | Betz et al. | |
| 2007/0198451 A1 | 8/2007 | Kehlenbeck et al. | |
| 2007/0198577 A1 | 8/2007 | Betz et al. | |
| 2007/0208683 A1 | 9/2007 | Geilich | |
| 2007/0258642 A1 | 11/2007 | Thota et al. | |
| 2007/0276845 A1 | 11/2007 | Geilich | |
| 2008/0104019 A1 | 5/2008 | Nath et al. | |
| 2008/0120310 A1* | 5/2008 | Khoury | G06F 17/30038 |
| 2008/0189249 A1 | 8/2008 | Petakov et al. | |
| 2009/0119255 A1 | 5/2009 | Frank et al. | |
| 2013/0191385 A1 | 7/2013 | Vespe et al. | |
| 2014/0129538 A1 | 5/2014 | Hogue et al. | |
| 2014/0289177 A1 | 9/2014 | Laroco et al. | |
| 2014/0372473 A1 | 12/2014 | Zhao et al. | |
| 2014/0372478 A1 | 12/2014 | Zhao | |
| 2014/0379743 A1 | 12/2014 | Yakovenko et al. | |

OTHER PUBLICATIONS

Chaves et al., "A Geographic Knowledge Base for Semantic Web Applications", 2005, Departamento de Informatica, Faculdade de Ciencias—Universidade de Lisboa, Lisboa, Portugal, pp. 15 (Year: 2005).*

Etzioni, et al., "Web-Scale Information Extraction in KnowItAll (Preliminary Results)", WWW2004, May 17-22, 2004, pp. 100-110.

Gilster, "Get fast answers, easily", Newsobserver.com, retrieved from http://web.archive.org/web/20050308154148/http://newsobserver.com/business/technology/gilster/2003/story/1258931p-7372446c.html, May 14, 2003, 2 pages.

Katz, et al., "Omnibase: Uniform Access to Heterogeneous Data for Question Answering", NLDB 2002, LCNS 2553, 2002, pp. 230-234.

Kwok, et al., "Scaling question answering to the web", ACM Transactions on Information Systems, vol. 19, No. 3, Jul. 2001, pp. 242-262.

Lam, et al., "Querying Web Data—The WebQA Approach", IEEE Proceedings of the 3rd International Conference on Web Information Systems Engineering, 2002, pp. 139-148.

Lopez, et al., "AquaLog: An Ontology-Portable Question Answering System for the Semantic Web", ESWC 2005, LNCS 3532, 2005, pp. 546-562.

(56) References Cited

OTHER PUBLICATIONS

Mahlin, et al., "DOrAM: Real Answers to Real Questions", AAMAS'02, Jul. 15-19, 2002, pp. 792-793.
McCurley, "Geospatial Mapping and Navigation of the Web", WWW10, May 1-5, 2001, pp. 221-229.
Pradhan, et al., "Building a Foundation System for Producing Short Answers to Factual Questions", Proceedings of the Eleventh Text Retrieval Conference (TREC 2002), NIST Special Publication SP 500-251, 2003, pp. 1-10.

* cited by examiner

Example Format of Facts in Repository (each fact is associated with an object ID)

Example Facts in Repository (each
fact is associated with an object ID)

Example Object
Reference Table

Example Format of Facts in
Repository (each fact is associated
with an object ID)

Example Objects

| |
|---|
| California: |
| CA, Cali., Calif., California, Golden State |
| New York: |
| NY, New York, Empire State |

FIG. 6 (a)

| |
|---|
| California: |
| Latitude: |
| 32°30'N to 42°N |
| Longitude: |
| 114°8'W to 124°24'W |
| New York: |
| Latitude: |
| 40°29'40"N to 45°0'42"N |
| Longitude: |
| 71°47'25"W to 79°45'54"W |

FIG. 6 (b)

DETERMINING GEOGRAPHIC LOCATIONS FOR PLACE NAMES

CROSS-REFERENCE TO RELATED APPLICATIONS

This application is a Continuation of, and claims priority to, U.S. patent application Ser. No. 13/732,157, filed on Dec. 31, 2012, entitled "DETERMINING GEOGRAPHIC LOCATIONS FOR PLACE NAMES IN A FACT REPOSITORY", which is a Continuation of U.S. patent application Ser. No. 11/686,217, filed on Mar. 14, 2007, entitled "DETERMINING GEOGRAPHIC LOCATIONS FOR PLACE NAMES IN A FACT REPOSITORY", now U.S. Pat. No. 8,347,202, the disclosures of which are incorporated by reference herein in their entirety.

TECHNICAL FIELD

The disclosed embodiments relate generally to analyzing place names extracted in a collection of documents. More particularly, the disclosed embodiments relate to analyzing place names that have been extracted from documents such as web pages.

BACKGROUND

Place names extracted from different sources have a variety of formats and may contain typographical errors, omissions, or unclear language. There may also be ambiguity as to whether a word represents a place name and whether different place names represent the same location. It is useful to have a way to identify the precise location of a place name.

SUMMARY

In accordance with one aspect of the disclosed implementations, a computer-implemented method and computer program product process a text string within an object stored in memory to identify a first potential place name. The method and computer program product determine whether geographic location coordinates are known for the first potential place name. Further, the method and computer program product identify the first potential place name as a place name and tag the identified place name associated with an object in the memory with its geographic location coordinates, when the geographic location coordinates for the first identified place name are known.

In one implementation, a system includes a potential place name identifier to determine if a text string contains a first potential place name. The system also includes a coordinate determiner to determine whether geographic location coordinates are known for the first potential place name. In addition, the system includes a place name identifier to determine whether the first potential place name is a place name and a coordinate assignor to tag the first identified place name associated with an object in the memory with its geographic location coordinates, when the geographic location coordinates for the first identified place name are known.

BRIEF DESCRIPTION OF THE DRAWINGS

FIG. 6(a) is an example illustrating a method for determining whether a text string corresponds to a potential place name, according to some implementations.

FIG. 6(b) is an example illustrating a method for determining whether there are geographic location coordinates known for a potential place name, in accordance with some implementations.

DESCRIPTION OF EMBODIMENTS

Embodiments of the present invention are now described with reference to the figures where like reference numbers indicate identical or functionally similar elements.

Figure 1:
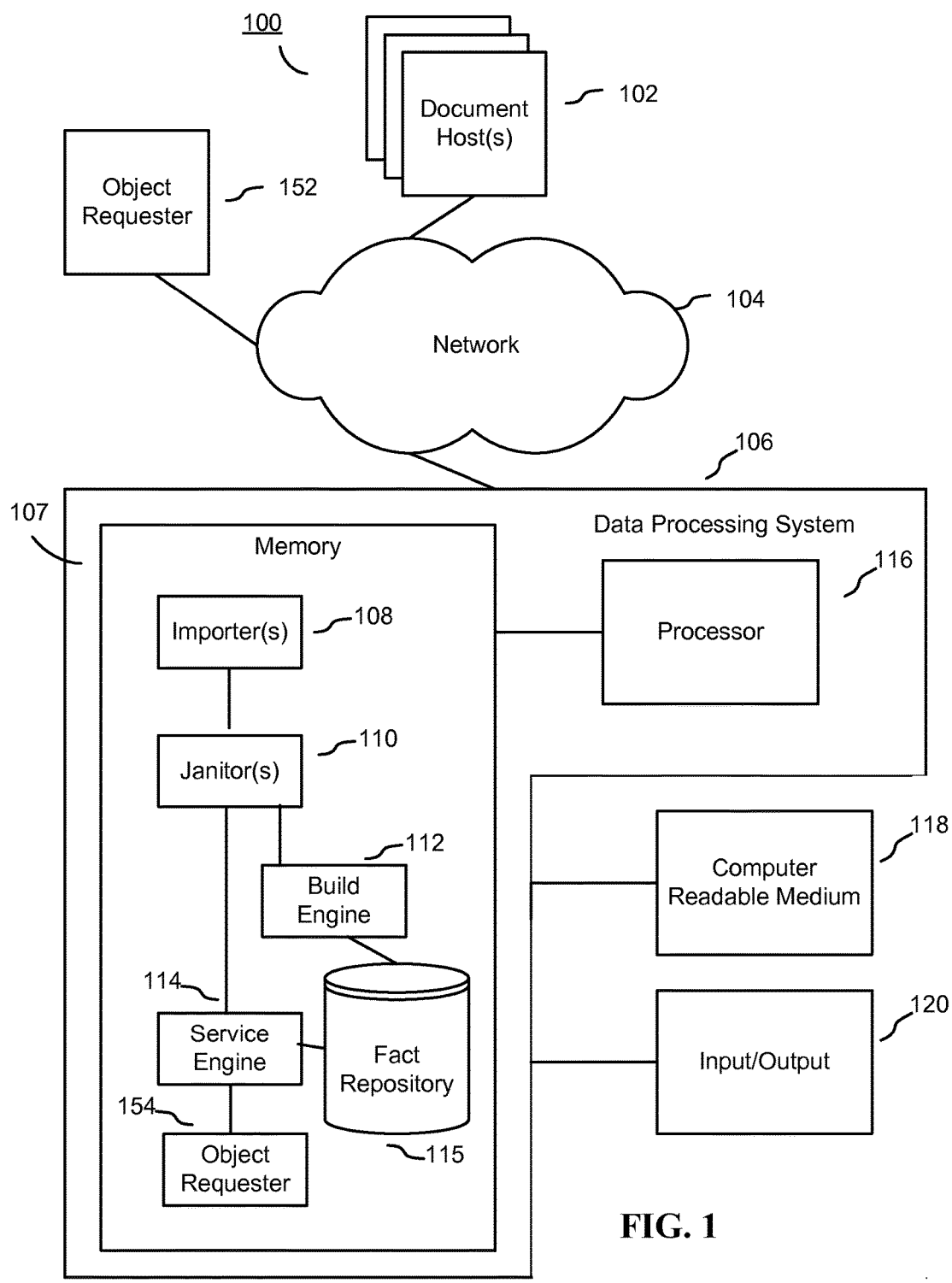
FIG. 1 shows a network, in accordance with some implementations.

FIG. 1 shows a system architecture 100, in accordance with some implementations. FIG. 1 shows components used to add facts into, and retrieve facts from a repository 115. The system architecture 100 includes a network 104, through which any text string of document hosts 102 communicate with a data processing system 106, along with any text string of object requesters 152, 154.

Document hosts 102 store documents and provide access to documents. A document is comprised of any machine-readable data including any combination of text, graphics, multimedia content, etc. One example of a document is a book (e.g., fiction or nonfiction) in machine-readable form. A document may be encoded in a markup language, such as Hypertext Markup Language (HTML), e.g., a web page, in an interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any text string of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any text string of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
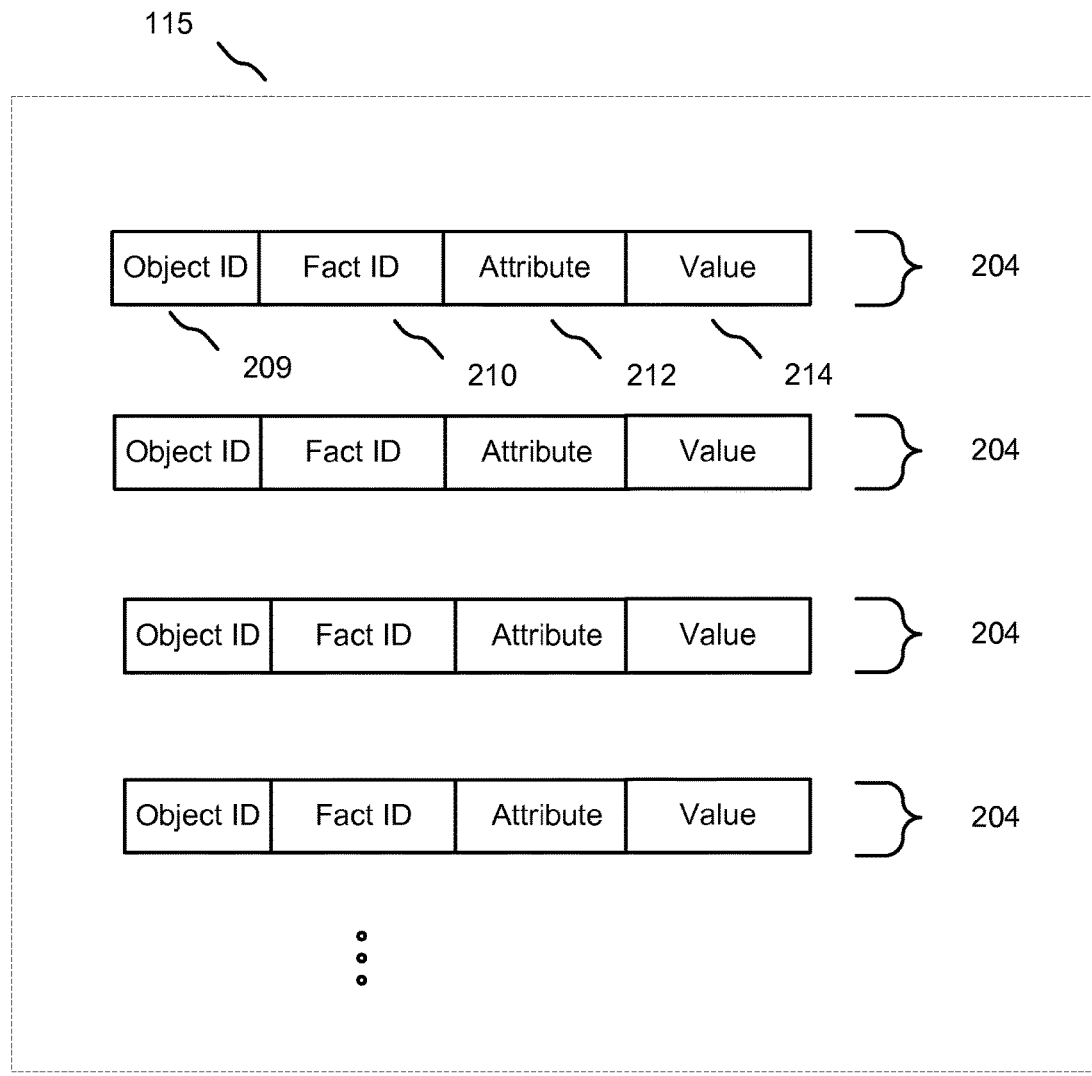
FIGS. 2(a)-2(d) are block diagrams illustrating a data structure for facts within a repository of FIG. 1 in accordance with some implementations.

FIG. 2(a) shows an example format of a data structure for facts within repository 115, according to some implementations. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
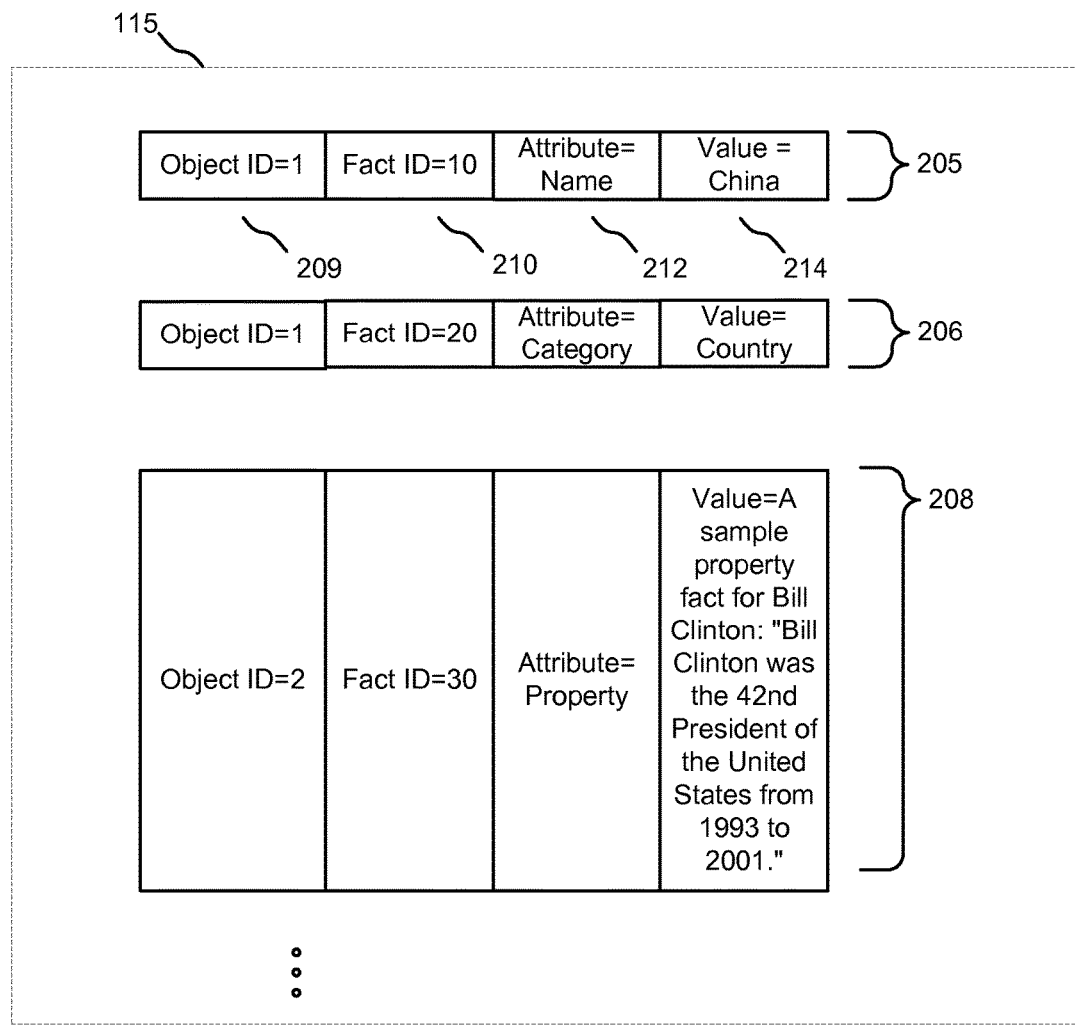

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The text string of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, text strings, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
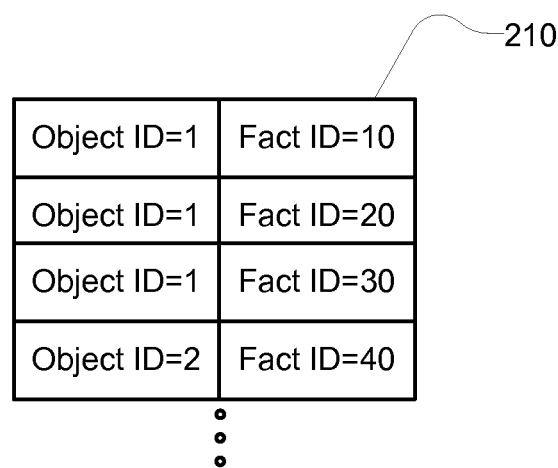

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
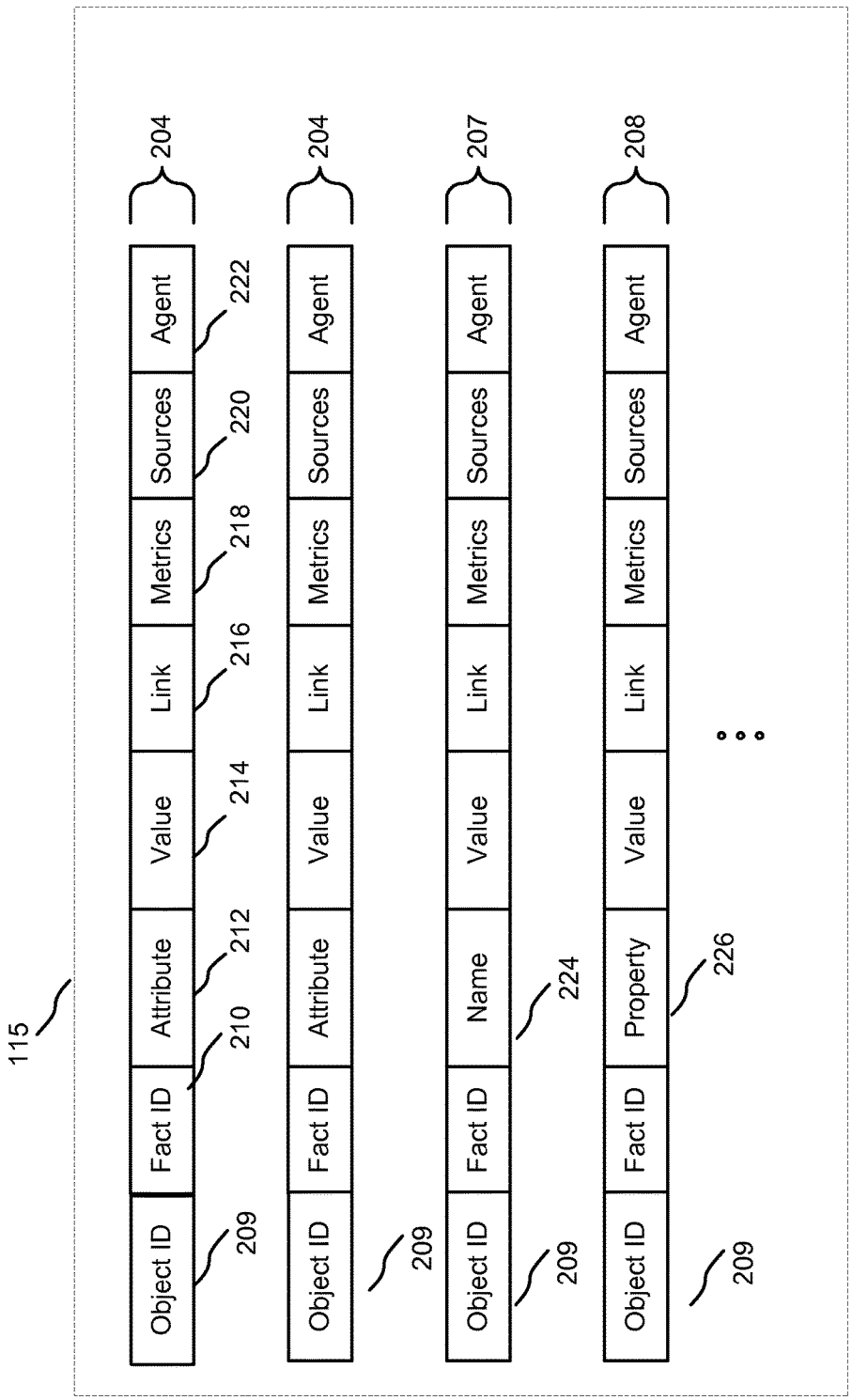

FIG. 2(d) shows an example of a data structure for facts within repository 115, according to some implementations showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
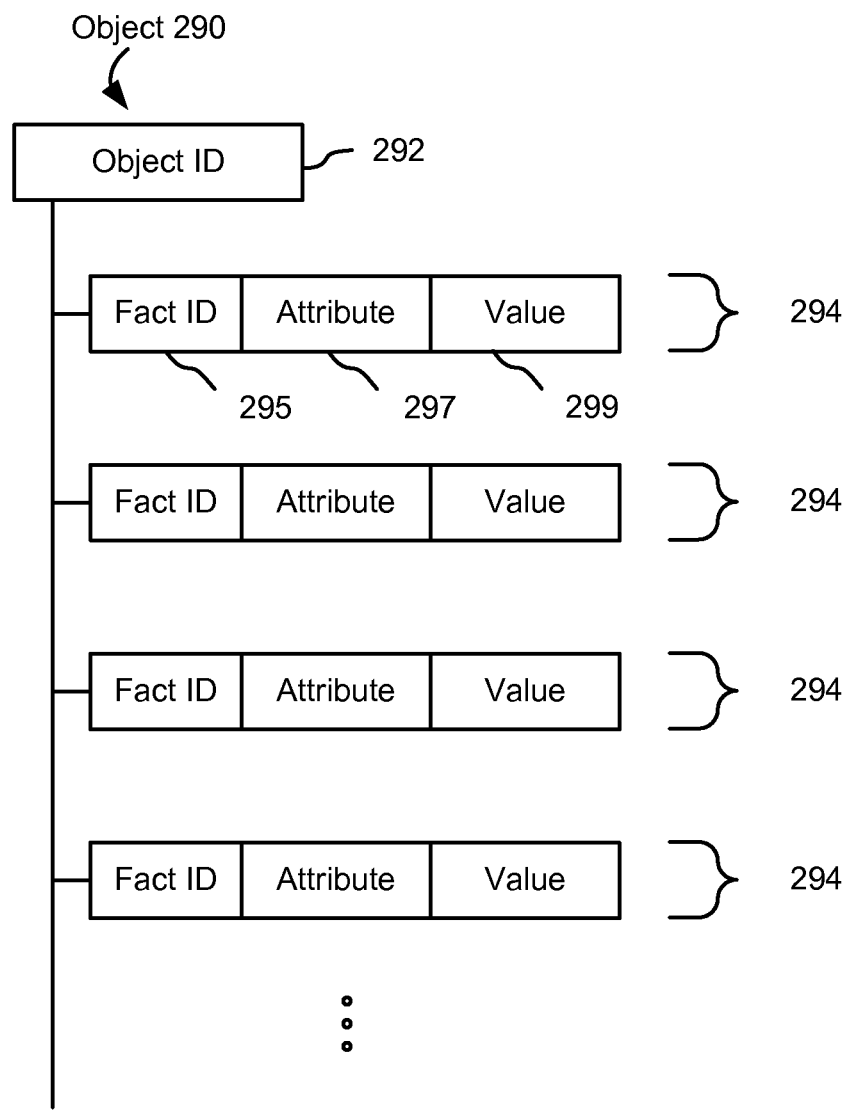
FIG. 2(e) is a block diagram illustrating an alternate data structure for facts and objects in accordance with some implementations.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
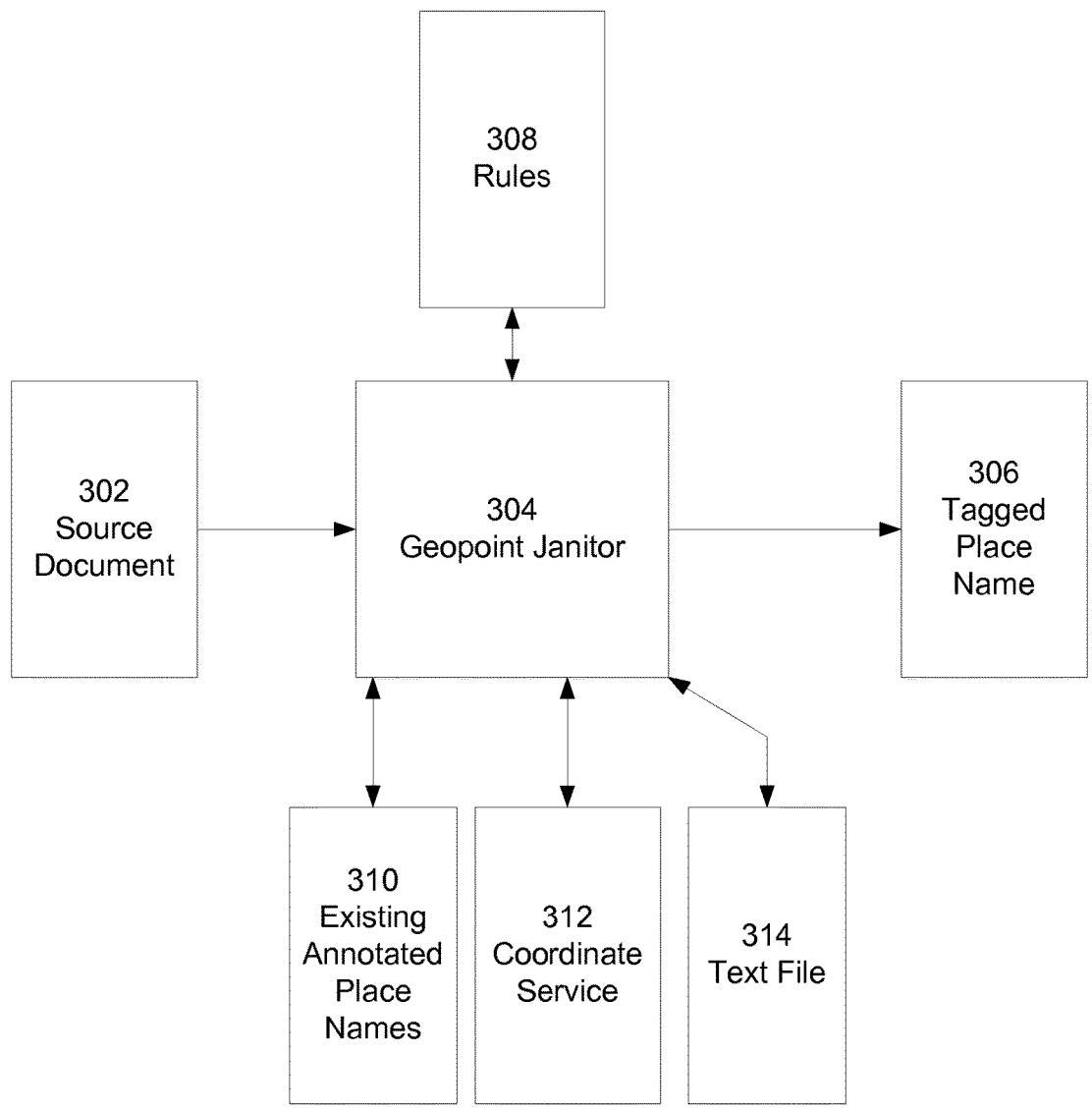
FIG. 3 is a data flow diagram illustrating a geopoint janitor, according to some implementations.

FIG. 3 is a data flow diagram illustrating a geopoint janitor 304, according to some implementations. A source document 302 may be a document, such as a website. The source document 302 may also be a fact that has been extracted previously from a document and may be stored within a computer memory. For the purposes of illustration, a single source document 302 is shown in FIG. 3. In another embodiment, a plurality of source documents 302 may be used by geopoint janitor 304.

According to one embodiment, geopoint janitor 304 determines whether at least one text string listed within source document 302 is a potential place name through the application of various rules 308, as described below with reference to FIG. 4. Geopoint janitor 304 determines whether there are known geographic location coordinates associated with the potential place name through examining a text file 314, existing annotated place names 310 and/or through a coordinate lookup service 312, according to one embodiment. If such known coordinates exist, geopoint janitor 304 tags the place name with the coordinates 306. The process of determining whether geographic location coordinates are known for the potential place name, and tagging the place name if the coordinates are known, is described below with reference to FIGS. 4-8(b).

Figure 4:
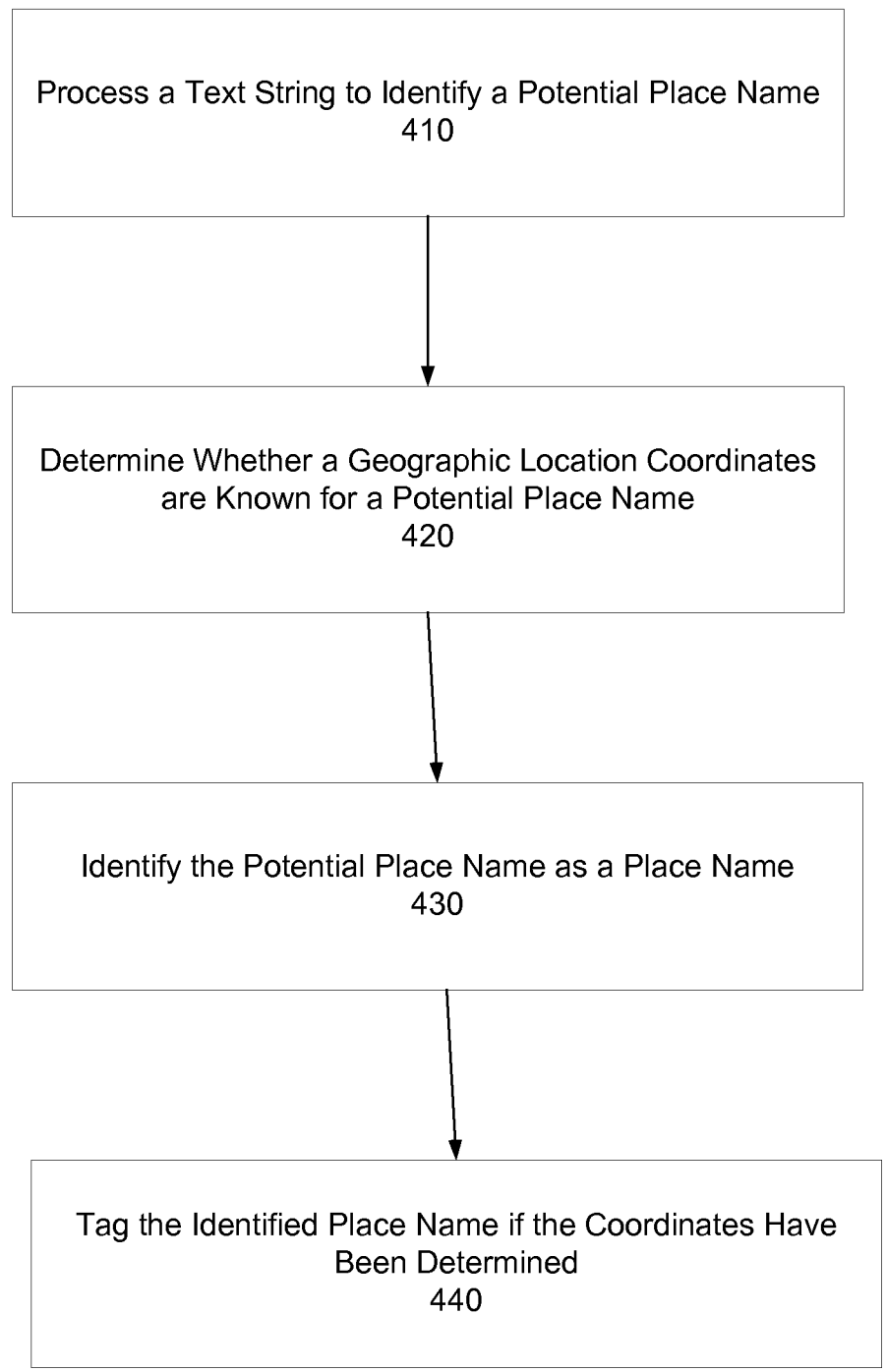
FIG. 4 is a flow chart illustrating a method for associating coordinates with potential place names, according to some implementations.

FIG. 4 is a flow chart illustrating a method for tagging place names with geographic location coordinates, according to with some implementations. While the method is described with reference to FIG. 4 as being performed by a geopoint janitor 304 on information from one or more websites, the method is also useful in other contexts in which it is desired to identify potential place names and tag the place names with geographic location coordinates, for example, from information stored in a fact repository or other data structure or memory.

According to one embodiment, geopoint janitor 304 processes a text string to identify one or more potential place names 410. The text string may contain multiple sentences (e.g. "I love visiting Las Vegas, as long as the trip lasts no longer than 48 hours. Also, it's best if at least two years have elapsed since my last trip.") The text string may be only a single word (e.g. "Hawaii").

Geopoint janitor 304 processes a text string to identify a potential place name 410 by examining whether the text string contains sequences of one or more capitalized words. For example, in the text, "I visited the Empire State Building in New York City," geopoint janitor 304 would examine the sequences, "I", "Empire State Building" and "New York City." The capitalized words may be one or more capitalized letters, such as "NY" and "N.Y." Geopoint Janitor examines the text string to identify a potential place name in accordance with various rules 308, such as eliminating consideration of certain noise words (e.g., The, Moreover, Although, In, However, I, Mr., Ms.) or not considering the first word of a sentence. In the previous example, the first sequence, "I", would be excluded from consideration based on rules eliminating noise words and/or the first word of a sentence. As another example of a rule 308, geopoint janitor 304 may consider the words preceding and/or following a potential place name. For instance, words after the word "in" in the previous example would be examined because "in" often precedes a place name. Knowledge of what often precedes a place name can be learned through an iterative process. For example, "in" could be learned from the above example if the geopoint janitor 304 already knows that "New York City" is a place.

Figure 5:
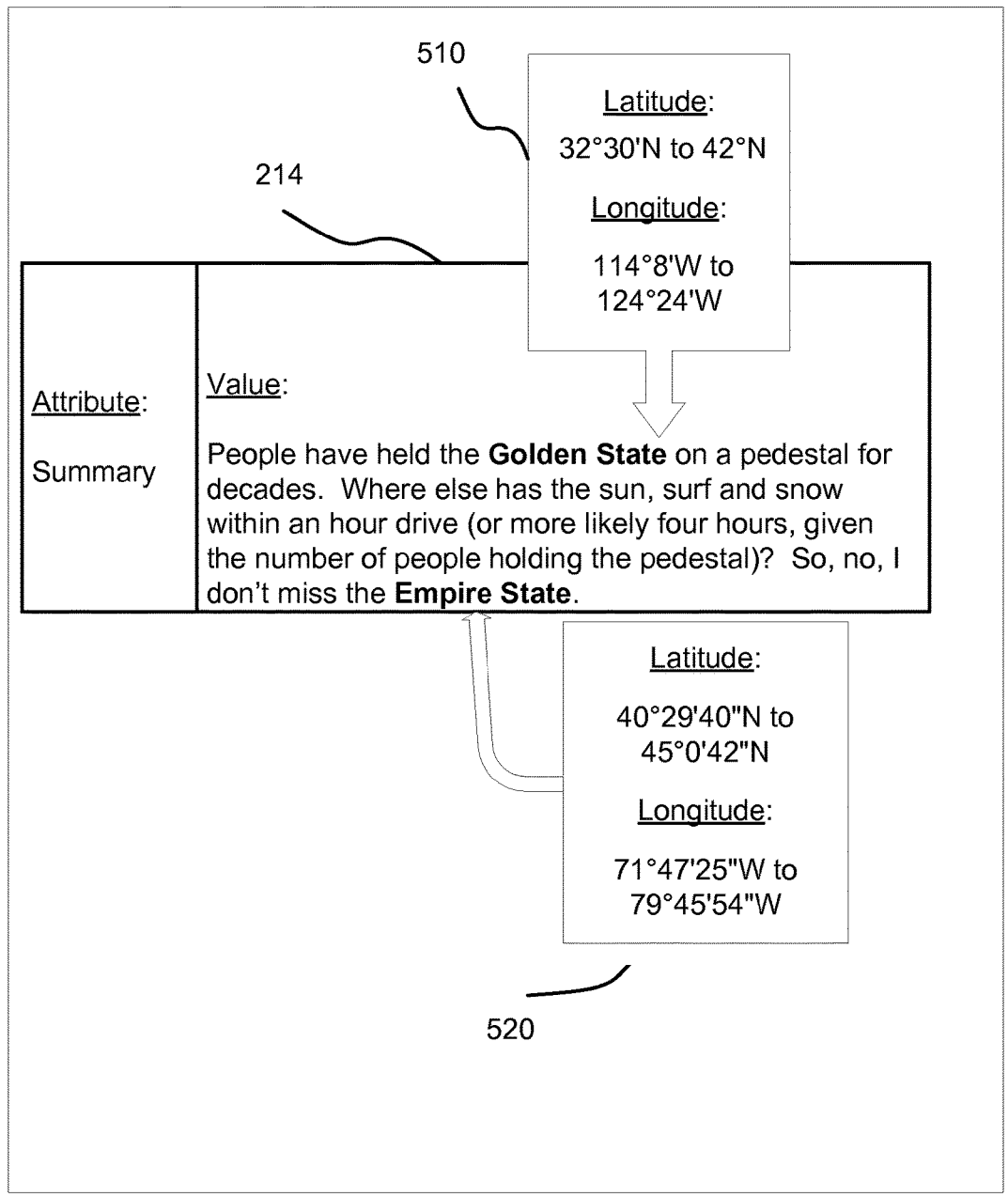
FIG. 5 is an example illustrating a method for associating coordinates with potential place names, according to some implementations.

FIGS. 5 and 6(a) illustrate how the geopoint janitor 304 can recognize variations of a potential place name, according to one embodiment. In FIG. 5, the text string depicted in value 214 has a variation of the state "California" as "Golden State" and the state "New York" as "Empire State." The geopoint janitor 304 can recognize various representations of the same names in variety of ways, such as by examining resources within its memory or accessing a collection of information. In one embodiment, when the variations of the same place name appear in the same text string (e.g. "I love visiting the Empire State; New York is a fabulous place to vacation."), geopoint janitor 304 can store the variations in memory for use in tagging other text strings. Examples of some of the other variations of the place names in FIG. 5 are stored in a computer memory as depicted in FIG. 6(*a*).

Figure 7:
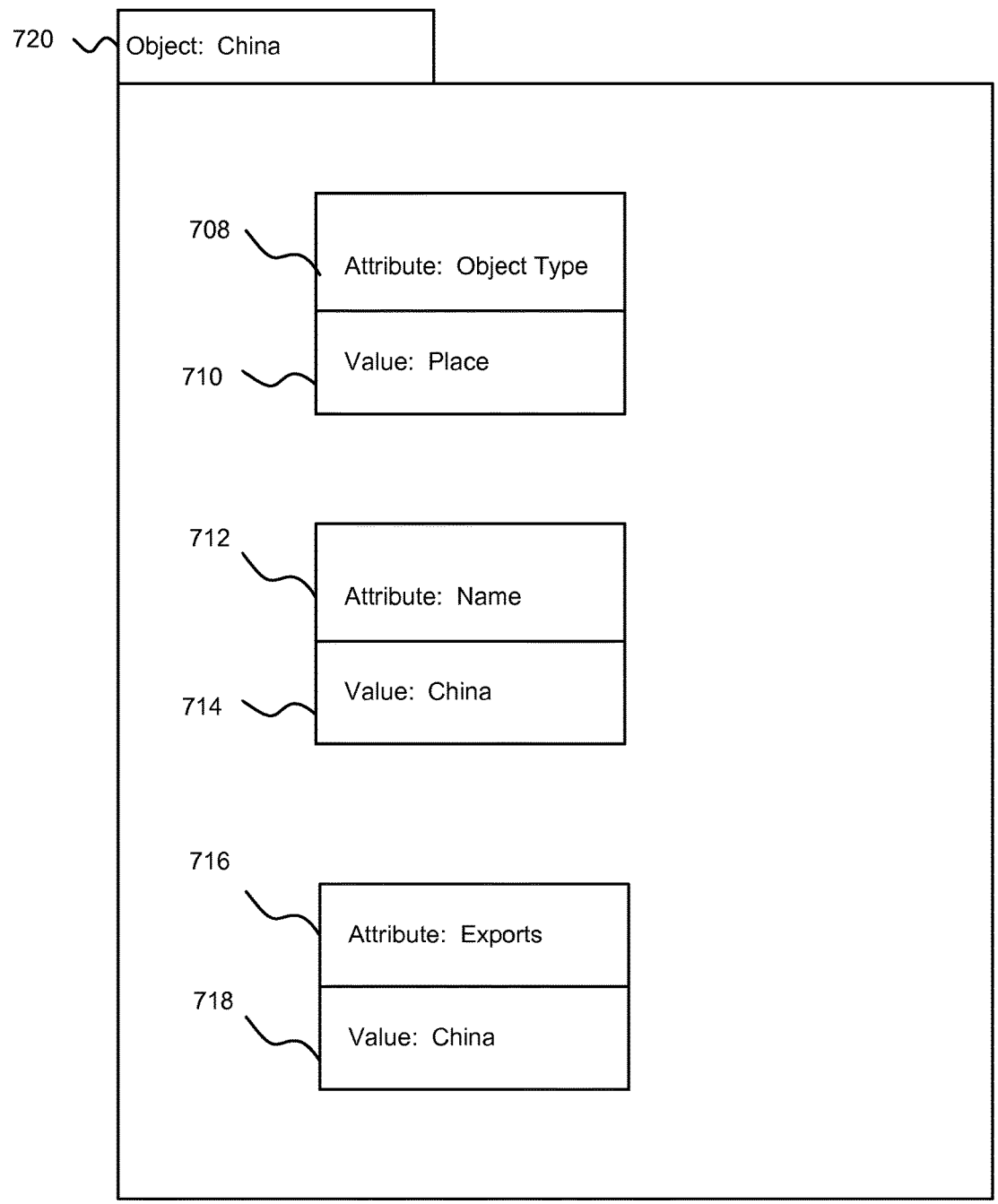
FIG. 7 is an example illustrating a method for determining whether a text string corresponds to a potential place name, according to with some implementations.

Turning now to FIG. 7, another rule 308 that the geopoint janitor 304 may use when processing a text string to identify a potential place name 410 (FIG. 4) is through examining attribute patterns for the attribute name associated with the text string. For example, a fact having as a value a text string that included the word "Turkey" would be ambiguous until the attribute name of the fact was examined. If the attribute name were "Food", this text string would not be identified as containing a potential place name. However, if the attribute name were "Country", the "Turkey" text string would be considered to have a potential place name. For example, the attribute value "China" 714 has an attribute name of "Name." Name 712 is ambiguous and does not help determine whether this "China" represents a place name or not. However, the attribute name 716 for the "China" text string 718 is "Exports" (referring to formal china dishes). It is clear that this text string that has an "exports" attribute would not be a potential place name.

Further, geopoint janitor 304 could also examine object type in determining whether a text string contains potential place name. In FIG. 7, the attribute name 712 for the "China" text string depicted in value 714 is "Name." The geopoint janitor 304 could further examine the object type 708 associated with "Object: China" 720, where the value 710 is "Place", to determine that the "China" text string depicted in value 714 in fact contains a place name (i.e., the name of a place is probably a place name). Therefore, the text string "China" 714, would be considered a potential place name.

Moreover, a rule may be created that if the type of an object (such as "China") is a place and if the attribute name for the text string at issue (associated with that object) is a name, then the text string at issue must contain a place name. This rule may be part of rules 308 (FIG. 3) to be used by Geopoint Janitor 304 in processing text strings to identify a potential place name 410 (FIG. 4).

In addition, the geopoint janitor 304 can determine which attributes are likely associated with location values. For example, if an attribute (i.e. Favorite Place) is determined to correspond to a location value more than a specified proportion of the time, geopoint janitor 304 can create a rule that all values associated with such an attribute are locations. For instance, assume the following facts were available:

Example 1A

Country: United States
Country: Russia
Country: UK

Example 1B

Favorite Place: Argentina
Favorite Place: UK
Favorite Place: The White House

In Example 1A, geopoint janitor 304 might not recognize UK as a place name at first. However, after the United States and Russia were both found to be places, geopoint janitor 304 could make the determination that a "Country" attribute is a "place" and therefore determine that the UK is a place.

In Example 1B, after the determination has been made that the UK is a place, and Argentina is a place, geopoint janitor 304 could make the determination that a "Favorite Place" attribute would correspond to a "place" value, so "The White House" is also likely to be a place. Geopoint janitor 304 can then use the expanded list of place-related attributes to search for additional place names.

Figure 8A:
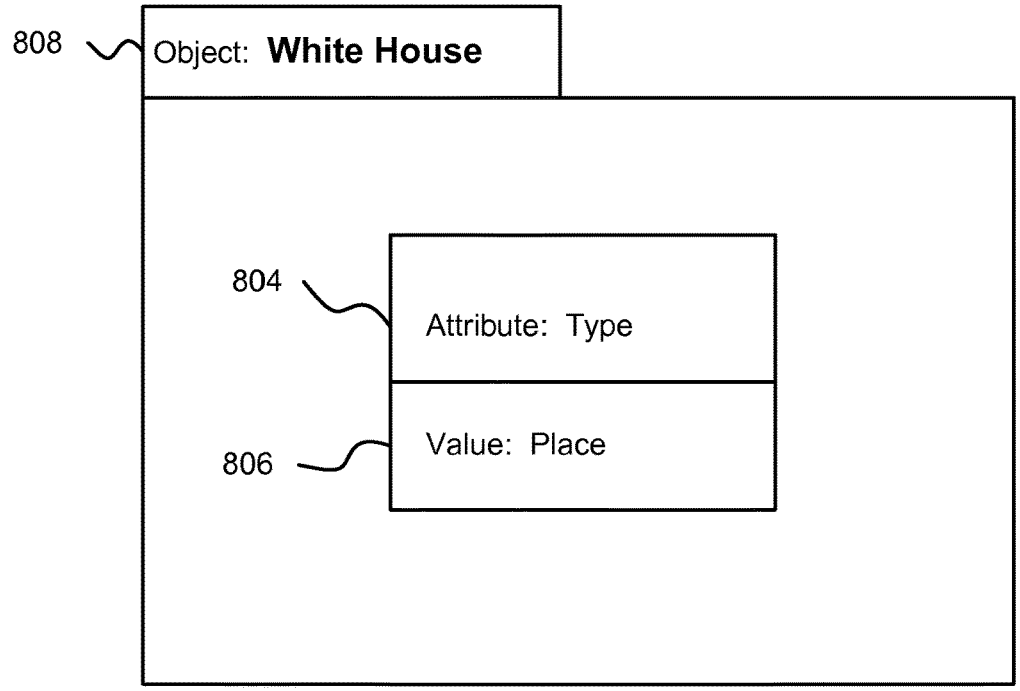
FIGS. 8(a) and 8(b) are examples illustrating a method for determining whether a text string corresponds to a potential place name, according to some implementations.
Figure 8B:
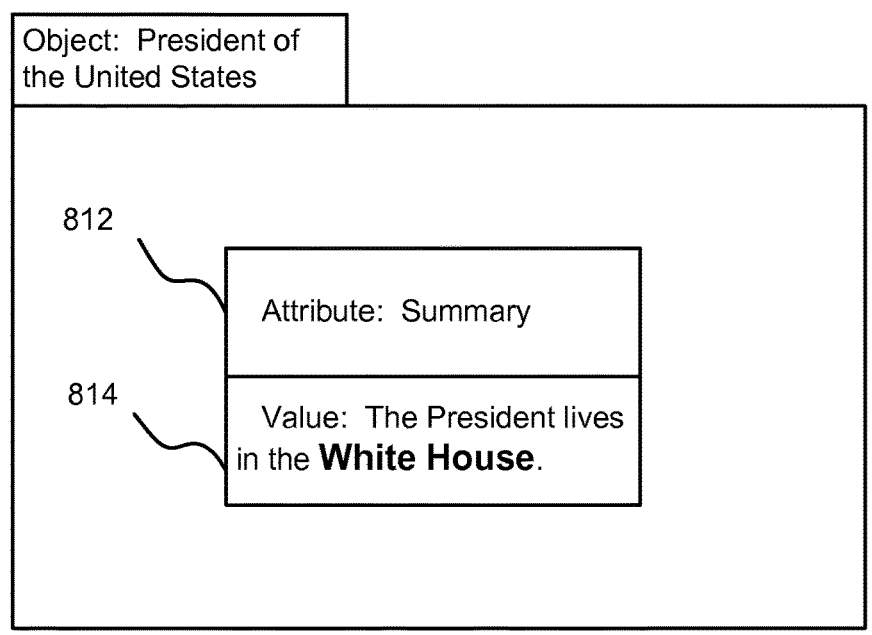

In FIGS. 8(*a*) and 8(*b*), a second object is examined to determine whether a text string contains a potential place name. In FIG. 8(*b*), the text string depicted in value 814 is "The President lives in the White House." Geopoint janitor 304 examines the object type 804 of "Object: White House" 808, which is "place." Because the object type 804 of the "White House" object 808 is a place, geopoint janitor 304 recognizes that the text string "The President lives in the White House" contains the identical words, and therefore "White House" is a place name.

Returning now to FIG. 4, geopoint janitor 304 determines whether geographic location coordinates are known for the potential place name 420. The geopoint janitor 304 makes this determination in variety of ways, such as by examining resources within its memory, for example existing annotated place names 310, by examining a text file 314, or by accessing a collection of information, for example a coordinate lookup service 312.

FIGS. 5 to 6(*b*) illustrate a method for determining whether geographic location coordinates are known for a potential place name 420, according to some implementations. After the text string in value 214 of FIG. 5 has been processed to identify potential place names, geopoint janitor 304 determines whether there are known geographic location coordinates associated with the potential place name through examining existing annotated place names 310, by examining a text file 314, and/or accessing a coordinate lookup service 312, according to one embodiment. For example, in FIG. 6(*b*), the geographic location coordinates for the California and New York place names are shown stored in a computer memory. A lookup function for "California," for example, will result in the latitude and longitude (or, here, the latitude and longitude ranges) for California. One of ordinary skill in the art will recognize there are various ways of providing and accessing a lookup service in addition to those illustrated in FIGS. 6(*a*) and 6(*b*).

Figure 9:
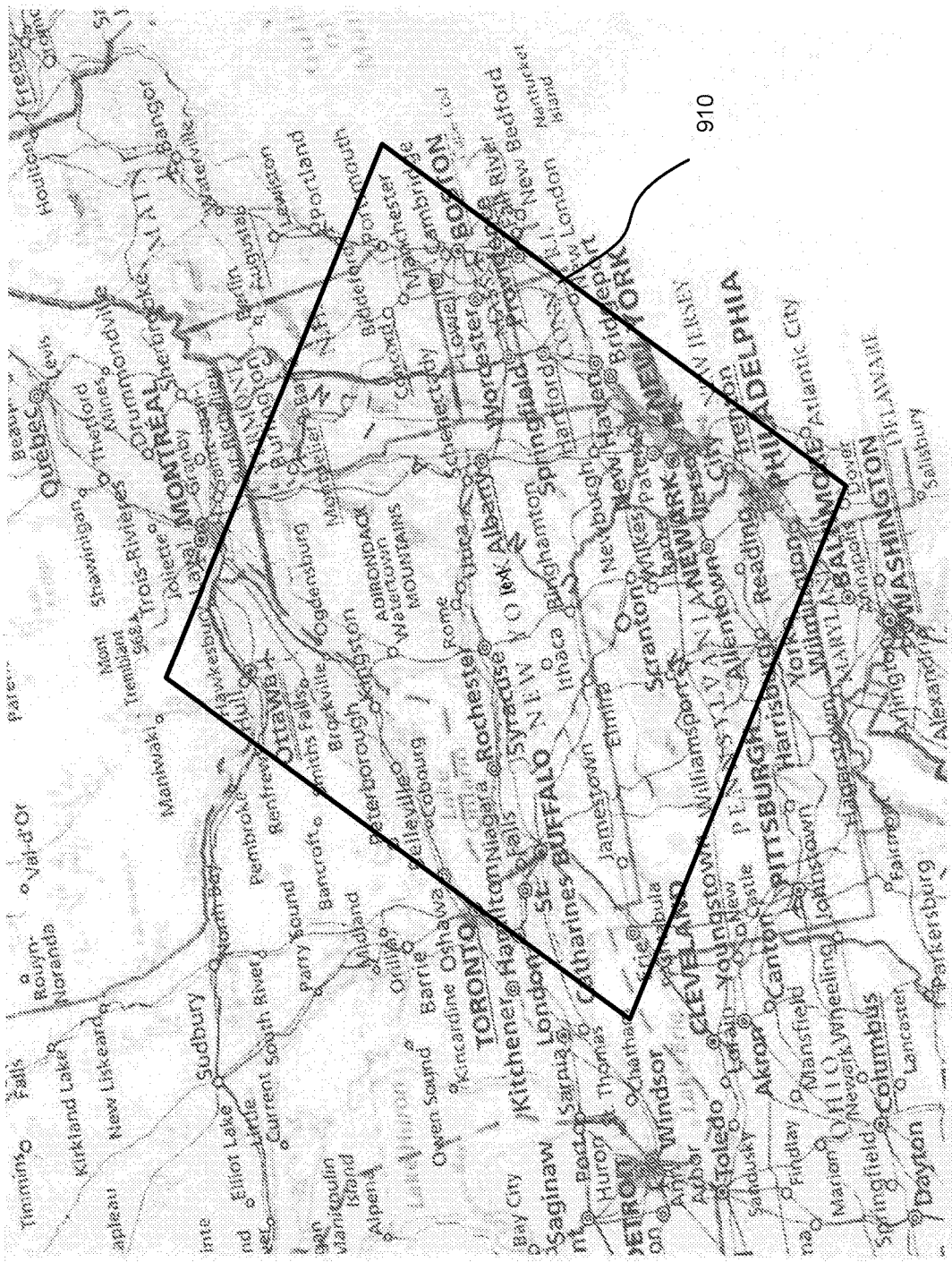
FIG. 9 is an example of a bounding box that would be assigned to a place name.

The lookup functions described above may yield various results. In one embodiment, a look up yields a place name with a latitude and a longitude. In another embodiment, the lookup results in the determination that the potential place name is in fact a place name, though it does not have location coordinates. Another lookup result is a place name with a bounding area 910 that has a latitude and longitude coordinate range, as shown for example in FIG. 9. In the example of a bounding area 910, depicted for New York State, parts of Canada, the Atlantic Ocean and other states are encapsulated within that area. Although a box shape is depicted in FIG. 9, a circle, polygon, rectangle or any other shape may be used as a bounding area. A line or point may also be used as a bounding area, or a set of unconnected circles, polygons, rectangles, lines, points, or other shapes may also define a bounding area. For example, the bounding area for the "United States" object might include a rectangle to represent the continental 48 states, a circle to represent Alaska, and a triangle to represent Hawaii.

When a lookup returns conflicting results, geopoint janitor 304 provides various disambiguation techniques for resolving the differences. In one embodiment, the lookup result that occurs most frequently is the preferred result. For example, if the lookup of a "New York" string returned one geolocation of "New York City" and another of "New York State", the preferred result would be the result that appears most frequently.

Figure 10:
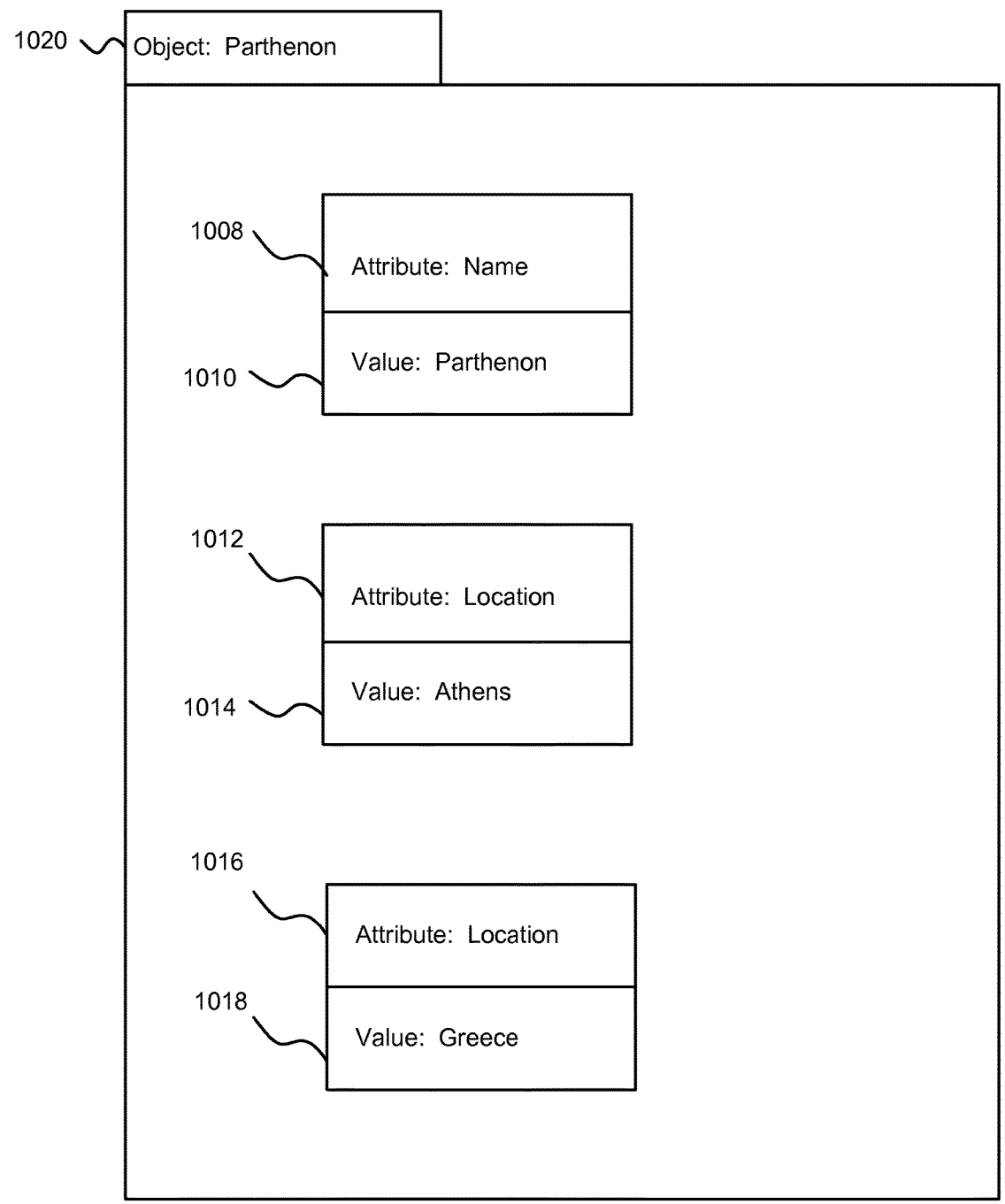
FIG. 10 is an example of input data in need of disambiguation.

In another embodiment, geopoint janitor 304 would examine the overlap of the returned results for disambiguation. FIG. 10 is an example of when different lookup results might occur and a technique for using the overlap of the results to disambiguate the returned results. In FIG. 10, the Parthenon Object 1020 has one fact with the location being Athens 1014 (from website xyz.com, for example) and another fact with the location being Greece 1018 (from website abc.com, for example). After applying the lookup to the "Athens" value 1014, geopoint janitor 304 finds that "Athens" has two sets of potential location coordinates: one potential set of location coordinates in Georgia and another potential location coordinates in Greece. After applying the lookup to the "Greece" value 1018, geopoint janitor 304 finds only one set of geographic location coordinates for the country of Greece. To resolve the ambiguity, geopoint janitor 304 can look in the same fact, according to one embodiment. For example, if the fact were "My favorite place to visit in Greece is Athens", geopoint janitor 304 could determine that Athens is in Greece based on the context of the fact. In another embodiment, geopoint janitor 304 could examine other facts on this object, such as the fact "Athens, Greece" with a location attribute. Facts with a "location" attribute could be weighted more heavily in the disambiguation determination, according to one embodiment.

The geopoint janitor 304 could also look at the context of the original source document, such as a web page from which the document was extracted. For example, if the source page describes Greek history, has Greek words on it, or is from a .gr domain, the geopoint janitor 304 would select the geopoint location coordinates in Greece rather than those in Georgia.

Figure 11:
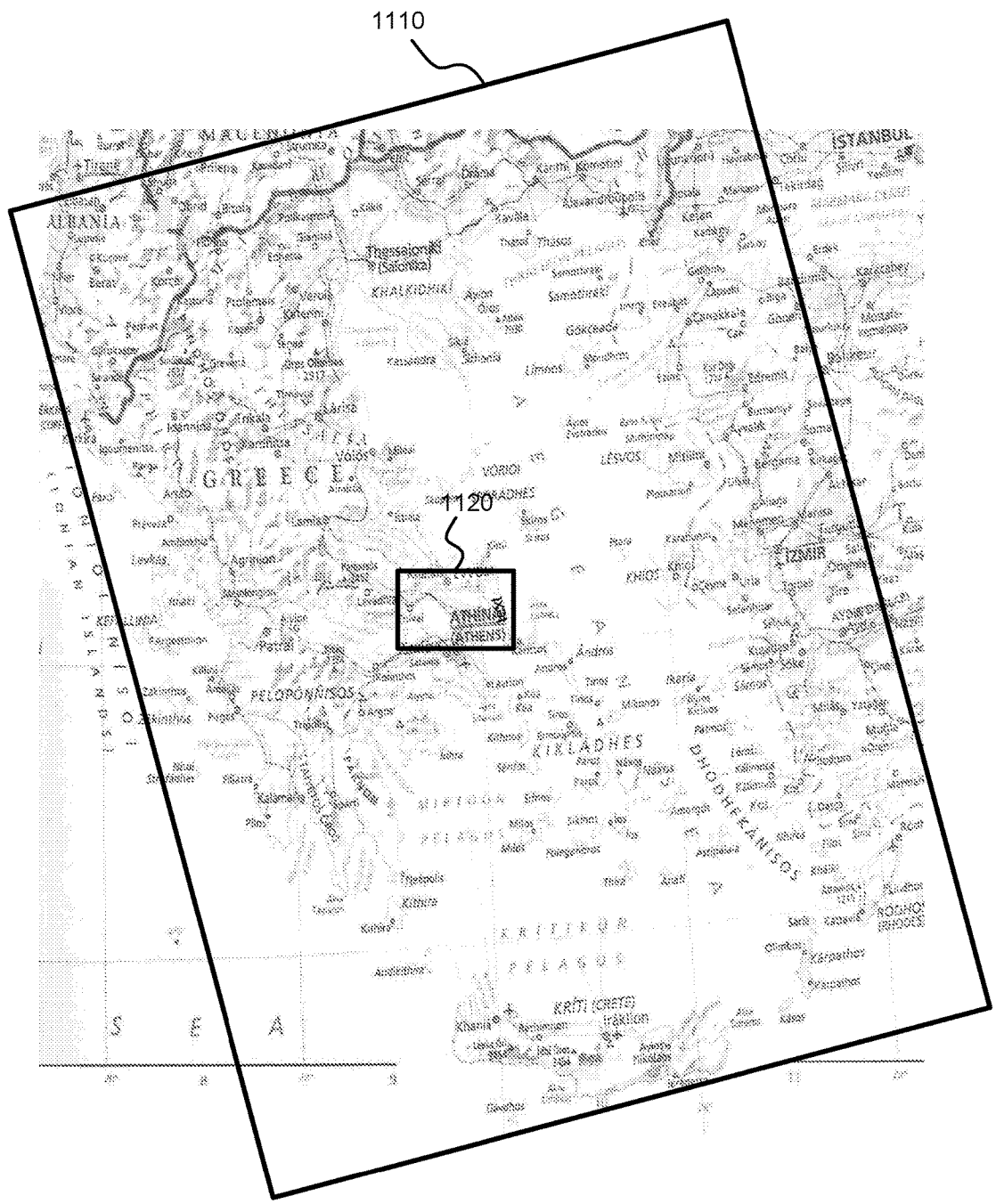
FIG. 11 is an example of a method for determining geographic location coordinates for an ambiguous potential place name.

In another embodiment, the geopoint janitor 304 determines any overlap between the potential geographic location coordinates and various location facts. As shown in FIG. 11, the boundary area for Greece 1110 overlaps with that for Athens, Greece 1120. As such, the potential location coordinates for the Athens in Georgia can be disregarded as incorrect, and the potential location coordinates for the entire country of Greece can be disregarded as too general. In another embodiment, geopoint janitor 304 would determine if the potential geolocation coordinates overlap or are a determined distance away from coordinates for another related fact in selecting the appropriate geolocation coordinates.

Returning now to FIG. 4, geopoint janitor 304 identifies 430 the first potential place name as a place name and tags 440 the place name if the geographic location coordinates have been determined 440. The tags may be located anywhere in the memory of the computer system. An illustration of tagging is shown in FIG. 5. For example, the potential place name of "Golden State" has been determined to be "California" from the table depicted in FIG. 6(a), as described above, and the geographic location coordinates are obtained from the table depicted in FIG. 6(b). The place name is then tagged, as shown in reference numeral 510, with its respective known geographic location coordinates.

Similarly, the potential place name of "Empire State" in FIG. 5 has been determined to be "New York" from the table depicted in FIG. 6(a), and the geographic location coordinates are obtained from the table depicted in FIG. 6(b). The place name is then tagged, as shown in reference numeral 520, with its respective known geographic location coordinates. One of ordinary skill in the art will recognize there are various ways of tagging place names in addition to those illustrated in FIG. 5.

Reference in the specification to "one embodiment" or to "an embodiment" means that a particular feature, structure, or characteristic described in connection with the embodiments is included in at least one embodiment of the disclosed herein. The appearances of the phrase "in one embodiment" in various places in the specification are not necessarily all referring to the same embodiment.

Some portions of the above are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, text strings, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the disclosed implementations include process steps and instructions described herein in the form of a method. It should be noted that the process steps and instructions of the disclosed implementations can be embodied in software, firmware or hardware, and when embodied in software, can be downloaded to reside on and be operated from different platforms used by a variety of operating systems.

The disclosed implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the disclosed implementations are not described with reference to any particular programming language. It will be appreciated that a variety of programming languages may be used to implement the teachings of the disclosed implementations as described herein, and any references below to specific languages are provided for disclosure of enablement and best mode of the disclosed implementations.

While the disclosed implementations have been particularly shown and described with reference to one embodiment and several alternate embodiments, it will be understood by persons skilled in the relevant art that various changes in form and details can be made therein without departing from the spirit and scope of the disclosed implementations.

Finally, it should be noted that the language used in the specification has been principally selected for readability and instructional purposes, and may not have been selected to delineate or circumscribe the inventive subject matter. Accordingly, the present disclosure is intended to be illustrative, but not limiting, of the scope of the disclosed implementations, which is set forth in the following claims.

What is claimed is:

1. A computer-implemented method comprising:
identifying a fact from a document, the fact having an attribute and a value;
determining that the attribute indicates that the value includes a place name; and
in response to the determining:
identifying the place name based on the value,
determining two or more possible geographic location coordinates for the place name,
disambiguating between the two or more possible geographic location coordinates to select geographic location coordinates for the place name by identifying an other fact in the document related to the fact and selecting the geographic location coordinates for the place name based on distance from the selected geographic location coordinates to geographic location coordinates associated with the other fact, and
presenting the document with a tag that associates the fact with the geographic location coordinates.

2. The method of claim 1, wherein presenting the document with the tag includes tagging the place name of the fact with the geographic location coordinates.

3. The method of claim 2, wherein tagging includes converting the place name into a hyperlink to a map view.

4. The method of claim 1, wherein disambiguating between the possible geographic location coordinates includes examining the document for context.

5. The method of claim 1, wherein determining two or more possible geographic location coordinates for the place name includes examining a plurality of place names, each of the plurality of place names having been tagged previously with its respective geographic location coordinates.

6. The method of claim 1, wherein the geographic location coordinates for the place name include geographic location coordinates for a bounding area.

7. The method of claim 1, wherein disambiguating between the two or more possible geographic location coordinates includes:
determining an object related to the fact;
identifying a second fact related to the object, the second fact including an identified place name;
comparing the two or more possible geographic location coordinates for the place name with geographic location coordinates for the identified place name of the second fact; and
selecting the geographic location coordinates for the place name from the two or more possible geographic location coordinates based on the selected geographic location coordinates having overlapping bounding areas with the geographic location coordinates for the identified place name of the second fact.

8. The method of claim 1, wherein determining geographic location coordinates for the place name includes comparing the two or more possible geographic location coordinates for the place name with geographic location coordinates for an identified place name from the document.

9. The method of claim 1, further comprising:
storing the geographic location coordinates for the place name in a memory, the storing including associating the geographic location coordinates with the fact.

10. A system comprising:
at least one processor; and
memory storing instructions that, when executed by the at least one processor, cause the system to perform operations including:
identifying a fact from a document, the fact having an attribute and a value;
determining that the value includes a place name; and
in response to the determining:
determining two or more possible geographic location coordinates for the place name,
disambiguating between the two or more possible geographic location coordinates to select geographic location coordinates for the place name based at least in part on context retrieved by examining the document and by identifying an other fact in the document related to the fact and selecting the geographic location coordinates for the place name based on distance from the selected geographic location coordinates to geographic location coordinates associated with the other fact, and
presenting the document with a tag that associates the fact with the geographic location coordinates.

11. The system of claim 10, wherein the context includes an origin of the document.

12. The system of claim 10, wherein determining geographic location coordinates for the place name includes examining a plurality of place names, each of the plurality of place names having been tagged previously with its respective geographic location coordinates.

13. The system of claim 10, wherein the geographic location coordinates for the place name include geographic location coordinates for a bounding area.

14. The system of claim 10, wherein disambiguating between the two or more possible geographic location coordinates includes:
determining an object related to the fact;
comparing the two or more possible geographic location coordinates for the place name with geographic location coordinates for an identified place name of a second fact also related to the object; and selecting the geographic location coordinates for the place name from the two or more possible geographic location coordinates based on the selected geographic location coordinates having overlapping bounding areas with the geographic location coordinates for the identified place name of the second fact.

15. The system of claim 10, wherein presenting the document with the tag includes tagging the place name of the fact with the geographic location coordinates.

16. The system of claim 10, wherein the memory further stores instructions that, when executed by the at least one processor, cause the system to perform operations including displaying a fact associated with the geographic location coordinates with a web page.

17. A computer-implemented method comprising:
   identifying a fact from a document, the fact having an attribute and a value;
   determining that the attribute of the fact indicates that the value of the fact includes a potential place name; and
   in response to the determining:
      identifying the place name based on the value of the fact;
      determining geographic location coordinates for the place name by examining frequencies with which the geographic location coordinates are associated with variations of the place name in a fact repository that includes a plurality of objects and a plurality of facts associated with the plurality of objects; and
      presenting the document along with a tag associated with the geographic location coordinates.

18. The method of claim 17, wherein presenting the document along with the tag includes tagging the place name of the fact with the geographic location coordinates.

19. The method of claim 18, wherein tagging includes converting the place name into a hyperlink to a map view.

20. The method of claim 17, further comprising:
   storing the geographic location coordinates for the place name in a memory, the storing including associating the geographic location coordinates with the fact.

* * * * *